June 30, 1953 J. T. WILNER 2,644,095

ELECTRICAL TUNING DEVICE

Filed March 29, 1946 2 Sheets-Sheet 1

INVENTOR
JOHN T. WILNER

BY

William D. Hall

ATTORNEY

June 30, 1953 J. T. WILNER 2,644,095

ELECTRICAL TUNING DEVICE

Filed March 29, 1946 2 Sheets-Sheet 2

INVENTOR
JOHN T. WILNER
BY
William D. Hall
ATTORNEY

Patented June 30, 1953 2,644,095

UNITED STATES PATENT OFFICE 2,644,095

ELECTRICAL TUNING DEVICE

John T. Wilner, Elizabeth, N. J., assignor to the United States of America as represented by the Secretary of War Application March 29, 1946, Serial No. 657,951

9 Claims. (Cl. 250—36)

This invention relates generally to a radio frequency oscillator, and, more particularly, to the resonant circuit of a so-called "flat-plate" oscillator and mechanical means for tuning same.

The so-called flat-plate oscillator consists essentially of two triode vacuum tubes, the anodes and grids of which are coupled together by flat plates respectively. The flat plates are mounted parallel to each other such that they afford an effective capacitive coupling between the anodes and the grids of the vacuum tubes. The field geometry existing between the two plates effectively constitutes a parallel resonant circuit comprising a capacitance and an inductance being afforded primarily by virtue of the dimensions, spacing, and orientation of the flat plates. When the flat plates are properly dimensioned and spaced with respect to each other, a voltage of the proper phase and amplitude to produce and sustain oscillation will occur between the electrodes. The flat-plate oscillator is substantially a push-pull, ultra audio oscillator.

The magnitude of the capacitive coupling afforded by the two flat plates substantially determines the magnitude of the anode-to-grid feedback voltage. The magnitude of the capacitive coupling is determined, in part, by the effective area one plate affords the other. An object of the present invention is to provide a mechanical means for adjusting said effective area.

The value of the effective inductance existing between the two plates depends, in part, upon the electric field geometry existing between the plates. By lowering the effective inductance, the upper frequency limit at which the oscillator circuit will operate is increased. Accordingly, another object of the present invention is to be able to alter said field geometry in such a manner as to lower the inductance and increase the upper frequency limit.

The frequency at which such a flat-plate oscillator will oscillate depends, to a great extent, upon the magnitude of the capacitive coupling and the apparent inductance afforded by the arrangement and orientation of the plates. A further object of the present invention is to provide a single, simple mechanical control which will enable the capacitive coupling and the effective inductance to be adjusted simultaneously, and, thereby, in a vernier fashion, allow the flat-plate oscillator to operate at a particular frequency. It is still another object to provide a rough-tuning means for adjusting the operating frequency of the oscillator.

Other objects, features and advantages of this invention will suggest themselves to those skilled in the art, and will become apparent from the following description of the invention, taken in connection with the accompanying drawings, in which.

Figure 1:
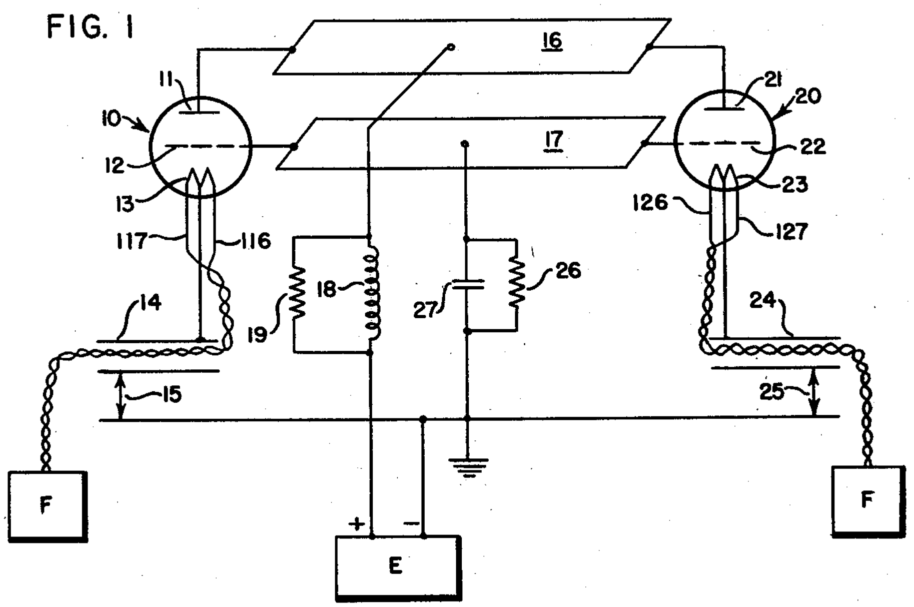
Fig. 1 is a schematic circuit diagram of a flat-plate oscillator.

In describing the essential electrical components of a flat-plate oscillator, reference will be made to the schematic circuit diagram of Fig. 1. The oscillator includes two triode vacuum tubes 10 and 20, including anodes 11 and 21, control grids 12 and 22, and center tapped filaments 13 and 23, respectively. A flat plate 16 is connected between anode 11 and anode 21. A second flat plate 17 which is oriented parallel to flat plate 16 is connected between control grids 12 and 22. A direct current (D.-C.) potential from a suitable source, designated herein as voltage E, is applied through radio frequency choke 18 and in parallel with damping resistor 19 to the geometric center of flat plate 16. The negative end of the voltage source E is connected to radio frequency ground potential. The geometric center of the flat plate 17 is connected to radio frequency ground potential through the grid bias resistor 26 in parallel with capacitor 27.

A suitable filament potential, from a source designated herein as voltage F, is applied through conductors 116 and 117 to the ends of filament 13. Metal tube 14 surrounds conductors 116 and 117 and extends close to the filament terminals of triode 13. The center tap of filament 13 is connected to one end of hollow tube 14. Adjustable shorting bar 15 shorts the opposite end of the hollow tube 14 to radio frequency ground potential.

The filament potential from the source designated herein as voltage F is also applied through conductors 126 and 127 to the ends of the filament 23 of vacuum tube 20. Metal tube 24 surrounds conductors 126 and 127 and extends close to the filament terminals of triode 20. The center tap of filament 23 is connected to one end of the hollow tube 24. An adjustable shorting bar 25 shorts the opposite end of the hollow tube 24 to radio frequency ground potential. Shorting bars 15 and 25 are used to control the excitation on the grids of the vacuum tubes to enable oscillations to be generated and forms, along with hollow tubes 15 and 25, R-F chokes.

When the oscillator is to operate at a particular frequency, the spacing and the dimensions of the respective flat plates are fixed. As mentioned heretofore, the field geometry existing between the two plates effectively constitutes a parallel resonant circuit comprising a capacitance and an inductance. By properly dimensioning and spacing the flat plates, a voltage of the proper phase and amplitude to produce and sustain oscillations will be transferred between the plates.

The structural arrangement permits the usual symmetry of construction and allows a vacuum tube of a commercial type, for example, RCA type 8012, to be used. Two terminals from each electrode of such a tube project through the glass envelope to the outside, and provide convenient means for connection to the flat plates. The structural arrangement of the flat plate tank circuit and a mechanical tuning device for a flat-plate oscillator embodying the principles of this invention using the tubes described are shown in Fig. 2.

Figure 2:
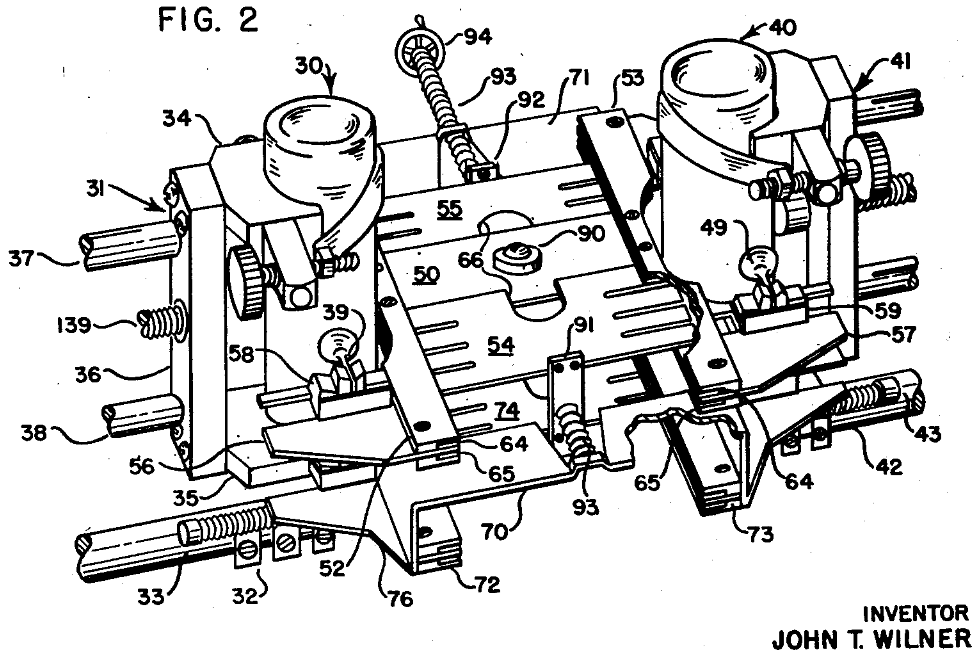
Fig. 2 is a pictorial showing, partially broken away, of a flat-plate oscillator embodying the principles of this invention.

In Fig. 2, vacuum tubes 30 and 40, corresponding to 10, 20 of Fig. 1 are shown in pictorial view. Anode electrode terminals 39 and 49 of the vacuum tubes 30 and 40, respectively, are visible in the drawing. The vacuum tubes 30 and 40 are secured in place by means of suitable clamping and strapping assemblies 31 and 41, respectively. Clamping and strapping assembly 31 includes two supporting and clamping asemblies 34 and 35 placed at alternate ends of the tube envelope and joined together by a connecting block 36. Assembly 31 slides on and is guided by slides 37 and 38. The horizontal position of the entire assembly 31 and tube 30 may be adjusted by means of a screw 139 acting upon block 36. Clamping and strapping assembly 41 is similar in construction and operation to assembly 31.

The anode plate assembly includes a fixed central metallic member 50 supported by a center post 90. Affixed to either end and orientated at right angles with member 50 are two guides 52 and 53. Each guide includes a top and bottom groove 64 and 65, respectively, along its inside edge, each groove being spaced above and below, respectively, the fixed member 50. The center portion of the guide between the two grooves 64 and 65 may be of a conductive material such as brass, and the outer sides of a suitable insulating material. The spring tension fingers on the ends of a movable planar or flat metallic member 54 are mated with the upper grooves 64 of guides 52 and 53. A cut-away section in guide 53 illustrates this method of assembly more clearly. The center portion 66 of one edge of the member 54 is cut out and the member is free to slide in the upper groove on one side of center post 90. The spring tension fingers on the ends of a second movable, planar or flat metallic member 55 are mated with the lower grooves 65 of guides 52 and 53, and on the opposite side of center member 90 with respect to movable member 54. Movable members 54 and 55 are similar in construction and function.

Connected to the ends of guides 52 and 53 and projecting therefrom and away from the movable elements are brackets 56 and 57, respectively. Two clamps 58 and 59 fit into grooves on the slides of brackets 56 and 57, respectively, and are free to move through a limited distance. Clamps 58 and 59 are oriented and positioned so that they receive the plate electrode terminals 39 and 49, respectively, of vacuum tubes 30 and 40, respectively. A similar arrangement of clamps and brackets, not visible in the drawing, is attached to the opposite ends of slides 52 and 53 to receive the remaining two anode electrode terminals. Such electrode terminal connections and tube clamps as mentioned heretofore allow the tube to be readily removed or its position readily adjusted by the screws connected to the clamping and strapping assemblies 31 and 41.

The elements referred to herein as the brackets, the center portions of the guides 64 and 65, and the fixed central member 50 are all in electrical contact with one another. They may therefore be constructed from a single sheet of conductive material such as brass. The movable members 54 and 55 of the anode plate assembly are also constructed of a sheet of conductive material such as brass. The movable members are in electrical contact with the center portions of the guides 64 and 65. The entire anode plate assembly effectively constitutes a telescoping flat plate, the effective area of which may be adjusted. The anode plate assembly will be shown in greater detail in Fig. 3.

Connecting blocks 91 and 92 of a suitable insulating material are connected to the center portion of the outer edges of movable elements 54 and 55, respectively. Blocks 91 and 92 are tapped to receive a left-handed thread and right-handed thread, on opposite ends, respectively, of an extension drive screw 93. In the pictorial drawing, only the ends of the drive screw are shown, this assembly being shown in greater detail in subsequent figures.

Screw 93 projects through a passage, not visible in the drawing, in center post 90 and is held in place by two collars on either side of the post, also not visible in the drawing. Details of the drive screw assembly will be shown in subsequent figures. A hand-wheel or knob 94 may be attached to one end of screw 93 for rotating the screw and causing elements 54 and 55 to move in or out.

A similar plate assembly is connected between the grid electrode terminals of the vacuum tubes. The grid plate assembly is similar in construction and operation to the above-mentioned plate assembly but includes a fixed metal bridge connected between the guides of the outer ends of the assembly. Only a portion of the grid plate assembly is visible in Fig. 2; however, the entire grid plate assembly will be shown in greater detail in Fig. 4.

Cathode filament chokes 32 and 42 may be hollow metal tubes, the lengts of which are adjusted to approximately a quarter wave-length of the operating frequency by means of screws 33 and 43, respectively. Chokes 32 and 42 of Fig. 2 correspond to the hollow tubes 14 and 24 and shorting bars 15 and 25, respectively, in Fig. 1.

Figure 3:
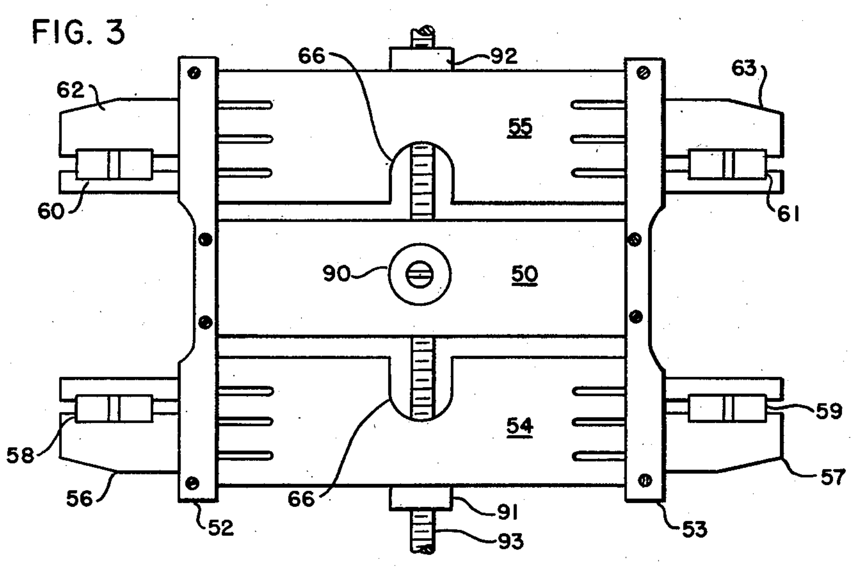
Fig. 3 is a top view of the anode plate assembly of the flat-plate oscillator shown in Fig. 2.

A more detailed view of the anode plate assembly is shown in Fig. 3. Parts corresponding to those of Fig. 2 bear similar reference numbers. The structure shown in Fig. 3 shows, in addition to that already described with reference to Fig. 2, two electrode terminal clamps 60 and 61 positioned upon brackets 62 and 63, respectively, which were described in connection with Fig. 2 but not visible therein.

Figures 4, 5:
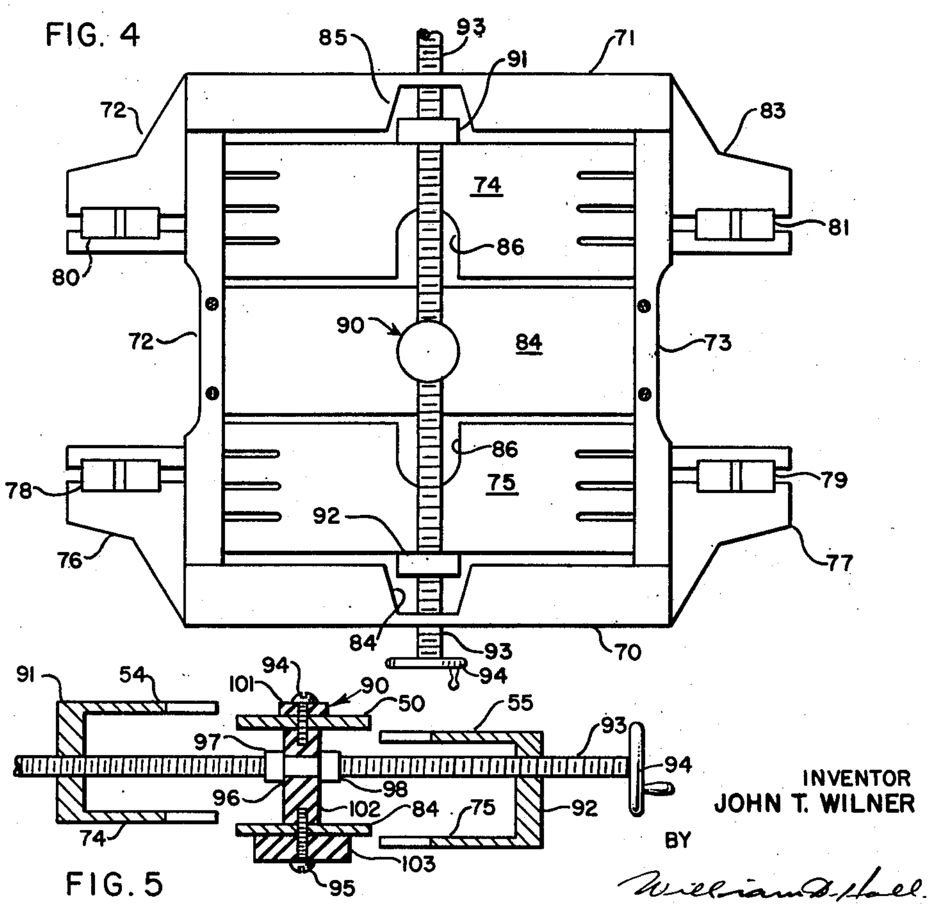
Fig. 4 is a top view of the grid plate assembly of the flat-plate oscillator shown in Fig. 2.
Fig. 5 is a cross-sectional view of the plate adjusting means embodied in the device of Fig. 2.

A more detailed view of the grid plate assembly is shown by Fig. 4. The grid plate assembly includes a fixed central metallic member 84 supported by center post 90. Affixed to each end of member 84 and oriented at right angles with respect to member 84 are two guides 72 and 73. Each guide includes, similarly to guides 52, 53, top and bottom grooves along its inner edge and spaced above and below member 84. The grid plate assembly guide may be constructed similarly to that of the anode plate assembly which has already been described. The spring tension fingers on the ends of a movable, planar or flat metallic member 74 are mated with the upper grooves of guides 72 and 73. The center portion 86 of one edge of member 74 is recessed, and the member is free to slide along the upper groove on one side of center post 90. The spring tension fingers on the ends of the movable member 75 are mated with the lower grooves of guides 72 and 73 on the opposite side of central member 84 with respect to movable member 74. Movable members 74 and 75 are similar in construction and operation.

Connecting blocks 91 and 92, connected to movable elements 54 and 55, respectively, of the anode plate assembly are also connected to the outer edges of movable elements 74 and 75, respectively. Corresponding movable elements of the two plate assemblies are thereby caused to move in unison when drive screw 93 is operated or rotated.

Fixed metal bridges 70 and 71 are connected between the corresponding ends of the guides 72 and 73, respectively. The metal bridges are contoured at each end so that they are physically spaced in the region between the grid and anode plate assemblies. A section 84 and 85 is cut out of the inside edge of the bridges 70 and 71 to allow the blocks 91, 92 on the movable elements to be adjusted to the desired limits of movement of the individual plates of the grid and anode plate assemblies.

Reference will now be made to the cross-sectional view of Fig. 5 for a detailed description of the manner in which two plate assemblies are joined together. The cross-sectional view is taken along the vertical axis of screw 93, and does not show the grooved guides into which the ends of the movable elements are mated. Center post 90 includes an insulating washer 101, an insulating spacer 102, and an insulating block 103. Spacer 102 separates the members 50 and 84. Center member 50 is attached to the top of spacer 102 by means of a screw 94 and washer 101. The entire center post is secured to a fixed body such as block 103 by means of a screw 95 projecting through the block, member 84, and into the lower end of spacer 102. The insulating connecting blocks 91 and 92 are shown connected to the respective movable plate elements. As mentioned heretofore, these blocks are tapped to receive the right-handed and left-handed threads of drive screw 93. The middle section of screw 93 passes through a hole 96 in spacer 102 and is held in place by means of collars 97 and 98 attached thereto on either side of the spacer. It can be seen that by turning a single adjustment such as a knob 94 which is attached to a screw 93, the movable elements are caused to move in or out.

Figs. 2 through 5 illustrate the structure of the flat-plate oscillator embodying the principles of this invention, and emphasis has been placed on the plate elements and the tuning means. The tuning is accomplished by a combination of changing the capacity between the plate assemblies by changing the effective areas, and by changing the effective inductance of the circuit by adjusting the position of the various electrode terminal clamps. The addition of the bridges 70 and 71 to the grid plate assembly produces a desirable effect in this connection because the change in the magnetic field configuration is such that the inductance is lowered by their addition, and therefore the upper frequency limit of the device is increased.

It is evident that the proper circuit elements described in connection with the circuit of Fig. 1 are contained in the flat-plate oscillator shown in Fig. 2. Its operation will be similar to that which has been described in connection with the circuit of Fig. 1.

While there has been described hereinabove what is at present considered to be a preferred embodiment of this invention, it will be obvious to those skilled in the art that various changes and modifications may be made therein without departing from the true spirit and scope of the invention.

What is claimed is:

1. In a flat-plate oscillator circuit including two vacuum tubes each having at least an anode and a control grid, a first and second flat-plate assembly joining said anodes and said control grids respectively, and oriented parallelly with respect to each other; said assemblies respectively including, two guide members each respectively coupled to one of the respective two tube elements its assembly is intended to join, a fixed plate member connecting said two guide members, and two movable members, one on each side of said fixed plate member, said movable members being substantially rectangular in shape and provided with finger end portions for engagement with and movement in said guide members to allow adjustment of the effective areas of said assemblies; a first and second insulating connector joining corresponding movable elements of said assemblies, a drive screw having right- and left-handed threads on opposite ends, said drive screw engaging right- and left-handed threads of said first and second connectors respectively and arranged such that rotation of said drive screw moves said corresponding movable elements, and two fixed bridge means attached to opposite ends respectively of said second flat-plate assembly.

2. A flat-plate oscillator including a pair of electronic devices each having at least an anode and a control grid, a plate assembly interconnecting said anodes, a second plate assembly interconnecting said grids, each plate assembly comprising a plurality of relatively movable plate members and a fixed plate member intermediate said movable plate members, and means for simultaneous relative adjustment of said movable plates of each assembly.

3. An electronic device including a pair of electron discharge devices each including at least anode and control grid electrodes therein, flat plate means respectively connecting said anodes and said grids, a flat-plate assembly external said devices and associated with at least one of said plate means, said assembly including a plurality of guide members connected to the ends of said one plate means, and a plurality of planar, movable members, substantially rectangular in shape and provided with finger end portions for engagement with and movement in said guide members, the flat plate means associated therewith being intermediate said movable members.

4. The device of claim 3, and further including means for adjusting the relative positions of said movable members to vary the effective area of said assembly.

5. A flat-plate oscillator as set forth in claim 2, and further including bridge means connecting the ends of one of said plate assemblies.

6. A flat-plate oscillator including two vacuum tubes each having at least an anode and a control grid, a first and a second flat plate assembly, said first assembly connecting said anodes and said second assembly connecting said control grids, each of said plate assemblies comprising a plurality of moving plate members and a fixed plate member intermediate said movable plate members.

7. The oscillator of claim 6, and further including bridge means connecting the ends of one of said plate assemblies.

8. The oscillator of claim 2, wherein said adjusting means comprises a drive screw coupled to said two pairs of movable plate members.

9. The device of claim 3 and further including bridge means connecting the ends of said assembly.

JOHN T. WILNER.

References Cited in the file of this patent

UNITED STATES PATENTS

| Number | Name | Date |
|---|---|---|
| 2,342,896 | Salzberg | Feb. 29, 1944 |

FOREIGN PATENTS

| Number | Country | Date |
|---|---|---|
| 109,093 | Australia | Apr. 11, 1940 |